United States Patent [19]

Thunissen

[11] Patent Number: 4,911,279

[45] Date of Patent: Mar. 27, 1990

[54] ROLLER TRACK

[75] Inventor: Kees W. Thunnissen, Boslaan, Netherlands

[73] Assignee: Talson Transport Engineering, B.V., Nuenen, Netherlands

[21] Appl. No.: 240,929

[22] Filed: Sep. 6, 1988

[51] Int. Cl.[4] .............................................. B65G 13/00

[52] U.S. Cl. ................................. 193/35 SS; 198/782

[58] Field of Search .................... 193/35 SS; 198/782; 244/118.1, 118.2, 137.1

[56] References Cited

U.S. PATENT DOCUMENTS

| | | | |
|---|---|---|---|
| 2,790,527 | 4/1957 | Griffith | 193/35 SS |
| 3,243,029 | 3/1966 | Oliver | 193/35 SS |
| 3,901,378 | 8/1975 | Rolland | 193/35 SS X |

FOREIGN PATENT DOCUMENTS

| | | | |
|---|---|---|---|
| 0098004 | 7/1980 | Japan | 193/35 SS |
| 0141303 | 9/1982 | Japan | 193/35 SS |
| 1303506 | 4/1987 | Japan | 193/35 SS |
| 0796092 | 1/1981 | U.S.S.R. | 193/35 SS |

*Primary Examiner*—Robert J. Spar

*Assistant Examiner*—James R. Bidwell

*Attorney, Agent, or Firm*—Helfgott & Karas

[57] ABSTRACT

A roller track comprises a series of rollers positioned with mutually parallal axes and transversely to the longitudinal direction of the series. The rollers are rotatably journalled in an elongated carrier which is received in a channel section of a housing which is closable at its open upper side by a cover plate. The carrier with the rollers is movable in vertical direction between a lower position, in which the rollers are completely sunk in the housing and an upper or operative position, in which the rollers extend by a fraction of their diameter through corresponding apertures in the cover plate. The carrier is assembled form a plurality of tilting members, each adapted for the rotatable support of a roller. The tilting members are coupled to each other at their upper sides at their lower sides. The coupling at the lower sides of the tilting members is formed by a connecting strip guided along the bottom of the channel section. The strip is movable in the longitudinal direction of the channel section between two end positions corresponding to the upper and lower position of the rollers, respectively.

6 Claims, 2 Drawing Sheets

ROLLER TRACK

The invention relates to a roller track comprising a series of rollers positioned with their axes mutually parallel and transverse to the longitudinal direction of the series, said rollers being rotatably journalled in an elongated carrier which is received in a channel or U-section which is closable at its open upper side by a cover plate which may be secured to the free end edges of the section flanges, the carrier with rollers being movable in vertical direction between a lower position in which the rollers are completely sunk in the housing and an upper or operative position in which the rollers extend by a fraction of their diameter through corresponding apertures in the cover plate.

Such roller tracks are known and are applied in loading floors of trucks adapted for container transport. Therein the roller carrier is generally constituted by an inner channel section supported by one or more inflatable air hoses extending in the longitudinal direction along the bottom or web of the outer channel section. By inflating the air hoses through a duct extending from a pressurized air source outside the roller track to a connection part within the channel section the carrier is movable from its lower or rest position into its upper or operative position, while conversely one is in a position to permit the carrier to sink back with the rollers in the inoperative lower position by opening a discharge valve.

Although such roller tracks are generally reliable it is mostly considered to be a disadvantage that inflating and venting the air hoses takes relatively much time and thereby constitutes a delay factor in the transport of the load, e.g. containers.

The invention aims at eliminating this disadvantage by the provision of a practical alternative for the U-shaped carrier supported by inflatable air hoses.

This purpose is achieved according to the invention in that the carrier is assembled from a plurality of tilting members, each adapted for the rotatable support of a roller, said tilting members being mutually coupled as well at their upper sides as at their lower sides, the coupling at the upper sides being stationary in longitudinal direction and the coupling at the lower sides being constituted by a connecting means guided along the bottom of the channel section, said means being movable in the longitudinal direction of the channel section between two end positions corresponding with the upper and lower roller position respectively. Thereby the roller carrier comprising mutually coupled tilting members may be quickly moved upwardly and downwardly by imparting a pushing or pulling force to the end of the connection means at the ends of the channel section, e.g. through the intermediary of a pneumatic or hydraulic piston cylinder device. The time necessary therefore is neglectably short as compared with the time necessary for the operation of the known air hoses (which is about 15 seconds).

In a first embodiment each tilting member comprises two rocker levers, each carrying a roller shaft end, said levers representing jointly with two upper coupling rods which are stationary in the longitudinal direction but movable in the vertical direction and mutually connect the roller shafts, and two lower coupling rods supported by the bottom of the channel section and constituting the longitudinally movable connecting means, a parallelogram.

In a second embodiment each tilting member is constituted by a bracket having a substantially U-shaped horizontal section with two side walls carrying the roller shaft and a connecting backwall, said bracket being mounted at its upper side adjacent to the backwall, articulated around a transverse axis spaced from the roller shaft, between the upright flanges of the channel section, the backwall of which is at its lower side in engagement with the longitudinally movable connecting means comprising a sheet strip.

In this embodiment the coupling of the tilting members at the upper end is thereby constituted by the upright flanges of the channel section. Thereby a structurally simple construction has been obtained.

The invention is further explained below with reference to the drawing of two embodiments given as examples.

Figure 1B:
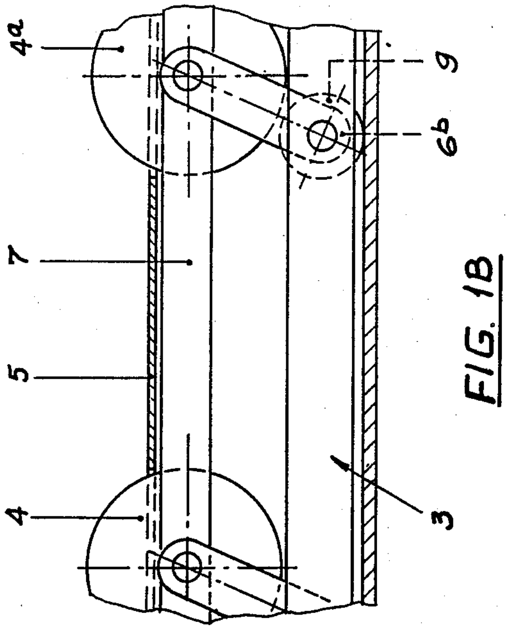
FIG. 1A and 1B show a cross-section and a longitudinal section respectively through a roller track according to the invention in a first embodiment, with the rollers in their operative carrying position.
Figure 2B:
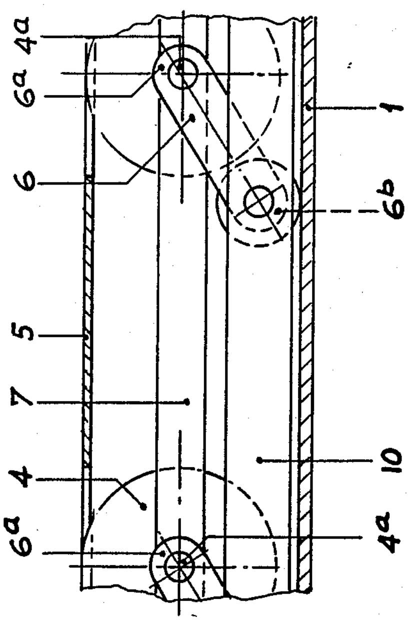
FIGS. 2A and 2B show the same cross-section and longitudinal section respectively as FIGS. 1A and 1B, but in this case with the rollers in their retracted inoperative position.
Figure 1A:
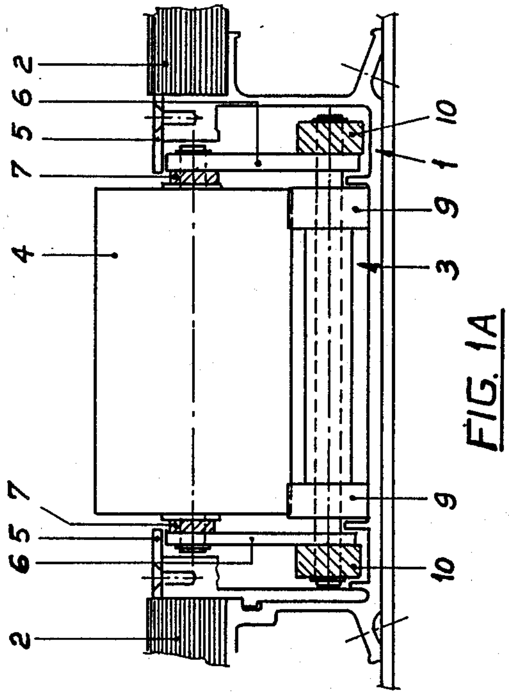
Figure 2A:
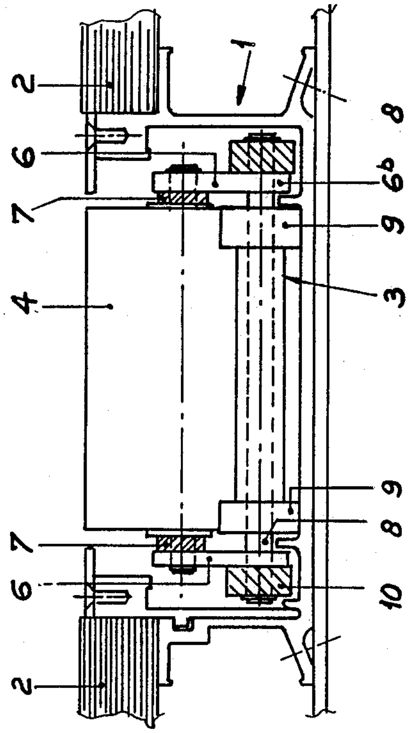

In FIGS. 1 and 2 which show a first embodiment of the roller track according to the invention, reference number 1 denotes a channel or U-section sunk into the loading floor 2 of e.g. a truck, in which is received a carrier 3 having a series of rollers 4. A cover plate 5 has been provided on the upper side of the U-section 1, said cover plate being provided with holes for (partially) passing the rollers 4.

For a detailed description of the U-section 1 reference may be had to Dutch patent application 8702129 of same Applicants and with same filing date.

In the embodiment under review the carrier 3 comprises for each roller 4 two rocker levers 6, the upper ends *6a* of which rotatably support the ends of the relative roller shaft *4a*. The shafts *4a* of the different rollers are mutually connected at both sides by coupling rods 7 the movement of which in the longitudinal direction of the channel section is blocked. The lower ends *6b* of each pair of rocker levers 6 are connected by a transverse axis 8 which also carries two support rollers 9 supported by the bottom of the U-section. The different transverse axes are mutually coupled at their ends by two coupling rods 10 which are movable in the longitudinal direction of the U-section 1. The ends of the coupling rods 10 projecting beyond a longitudinal end of the U-section 1 may e.g. be connected with the plunger of a stationary plunger-cylinder-device in order to impart a pulling force to the coupling rods 10 and thereby to move the rocker levers with the rollers from their somewhat slanting position in FIG. 2 to a more upright position according to FIG. 1. Conversely under the influence of their weight and of the load supported thereby, the rollers 4 will sink back to their retracted position according to FIG. 2 as soon as the supply pressure of the plunger cylinder device is removed and the pressure fluid used may flow back (towards the source).

Figure 3B:
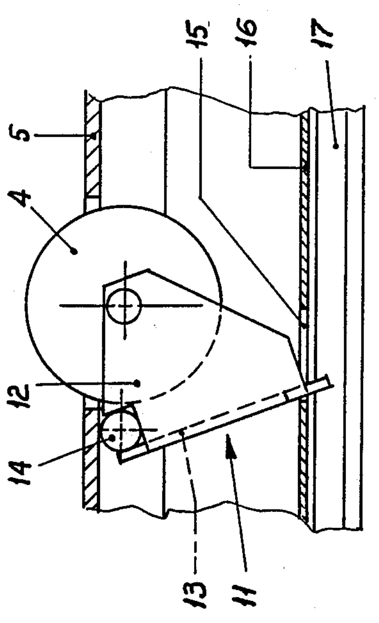
FIGS. 3A and 3B show a cross-section and a longitudinal section respectively through a roller track according to the invention in a second embodiment, with the rollers in their operative carrying position
Figure 3A:
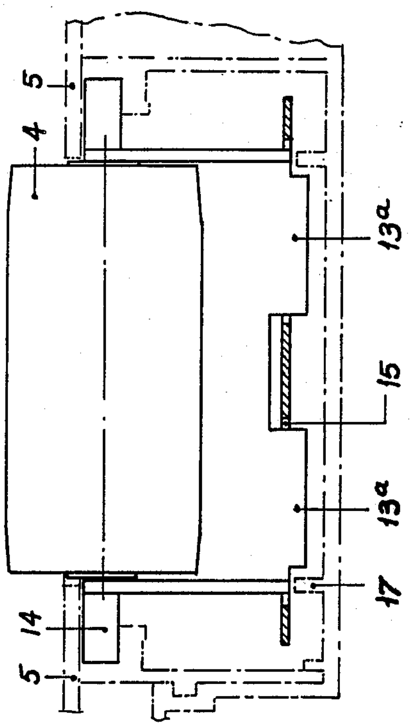
Figure 4B:
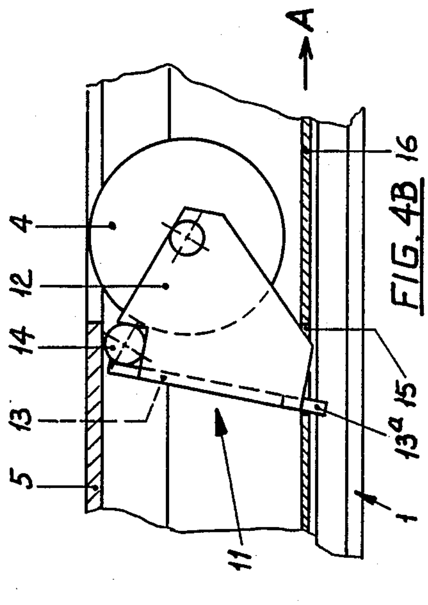
FIGS. 4A and 4B show the same cross-section and longitudinal section respectively as FIGS. 3A and 3B, but now with the rollers in their retracted inoperative position.
Figure 4A:
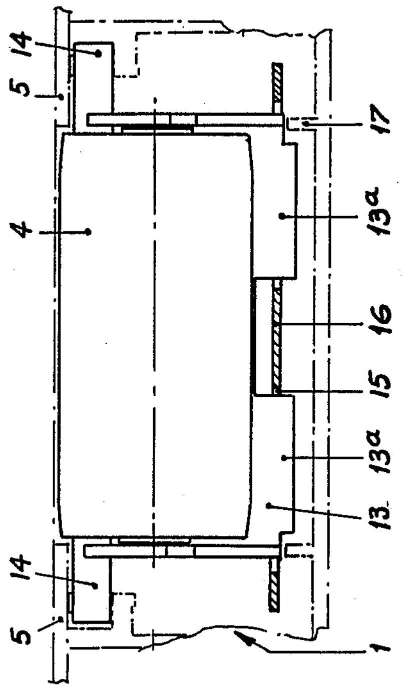

In the embodiment according to FIGS. 3–4 a like U-section as that according to FIGS. 1–2 is used.

In this second embodiment the carrier comprises for each roller 4 a bracket 11 having a substantially U-shaped horizontal section. This bracket has two side-walls 12 mutually connected by a backwall 13. The brackets 11 are each articulated at the upper side around a transverse axis 14 journalled in the facing flanges of the U-section 1. The rollers 4 are mounted with their roller shaft ends 4a in the bracket sidewalls 12.

The backwalls 13 of the brackets 11 engage with their somewhat projecting lower edges 13a with corresponding recesses 15 in a coupling sheet strip 16 supported longitudinally slidable by two ridges 17 upstanding from the bottom of the section 1. Like the coupling rods 10 in the first embodiment the coupling sheet strip 16 may be connected at a longitudinal end of the section 1 to e.g. the plunger of a pneumatic or hydraulic plunger-cylinder-device in order to impart a pulling force in the direction of the arrow A to the coupling plate and thereby to induce the brackets 11 to tilt around the transverse axes 14 from the position according to FIG. 3 to that according to FIG. 4.

I claim:

1. Roller track comprising a series of rollers positioned with their axes mutually parallel and transverse to the longitudinal direction of the series, said rollers being rotatably journalled in an elongated carrier which is received in a channel section which has flanges and is closable at its open upper side by a cover plate which may be secured to free end edges of the section flanges, the carrier with the rollers being movable in vertical direction between a lower position in which the rollers are completely sunk in a housing and an upper operative position in which the rollers extend by a fraction of a diameter thereof through corresponding apertures in the cover plate wherein the carrier is assembled from a plurality of tilting members, each adapted for a rotatable support of a roller, said tilting members being mutually coupled at their upper sides and their lower sides, the coupling at the upper sides being stationary in a longitudinal direction and the coupling at the lower sides being constituted by a connecting means guided along the bottom of the channel section, said means being movable in the longitudinal direction of the channel section between two end positions corresponding to the upper and lower position of the rollers, respectively, each tilting member being formed by a bracket having a substantially U-shaped horizontal section.

2. Roller track according to claim 1, wherein said substantially U-shaped horizontal section has two side-walls carrying a roller shaft and a connecting backwall, said bracket being mounted at its upper side adjacent to the backwall, articulated around a transverse axis spaced from the roller shaft, between the flanges of the channel section, the backwall of which is at its lower side in engagement with the longitudinally movable connecting means comprising a sheet strip.

3. Roller track according to claim 2, wherein the connecting backwall of the U-shaped section is arranged in the housing so that it moves through a vertical position when said rollers are moved from the lower position to the upper position.

4. Roller track comprising a series of rollers positioned with their axes mutually parallel and transverse to the longitudinal direction of the series, said rollers being rotatably journalled in an elongated carrier which has flanges and is received in a channel section which is closable at its open upper side by a cover plate which may be secured to free end edges of the section flanges, the carrier with the rollers being movable in vertical direction between a lower position in which the rollers are completely sunk in a housing and an upper operative position in which the rollers extend by a fraction of a diameter thereof through corresponding apertures in the cover plate, wherein the carrier is assembled from a plurality of tilting members, each adapted for a rotatable support of a roller, said tilting members being mutually coupled at their upper sides and their lower sides, the coupling at the upper sides being stationary in a longitudinal direction and the coupling at the lower sides being formed by a connecting means guided along the bottom of the channel section, said means being movable in the longitudinal direction of the channel section between two end positions corresponding to the upper and lower position of the rollers, respectively, each tilting member being pivotable about a transverse axle journalled in said flanges, said transverse axle of each tilting member being positioned so that an axis thereof and an axis of a respective roller are substantially at the same level when said rollers are in said upper position.

5. Roller track according to claim 4, wherein each tilting member is formed by a bracket having a substantially U-shaped horizontal section having two sidewalls carrying a roller shaft and a connecting backwall, said bracket being mounted at an upper side thereof adjacent said backwall, articulated about said transverse axis spaced from the roller shaft, between the flanges of the channel section, the backwall of which is at its lower side in engagement with the longitudinally movable connecting means comprising a sheet strip.

6. Roller track comprising a series of rollers positioned with their axes mutually parallel and transverse to the longitudinal direction of the series, said rollers being rotatably journalled in an elongated carrier which has flanges and is received in a channel section which is closable at its open upper side by a cover plate which may be secured to free end edges of the section flanges, the carrier with the rollers being movable in vertical direction between a lower position in which the rollers are completely sunk in a housing and an upper operative position in which the rollers extend by a fraction of a diameter thereof through corresponding apertures in the cover plate, wherein the carrier is assembled from a plurality of tilting members each adapted for a rotatable support of a roller, said tilting members being mutually coupled at their upper sides and their lower sides, the coupling at the upper sides being stationary in longitudinal direction and the coupling at the lower sides being formed by a connecting means guided along the bottom of the channel section, said means being movable in the longitudinal direction of the channel section between two end positions corresponding to the upper and lower position of the rollers, respectively, wherein each tilting member is formed by a bracket having a substantially U-shaped horizontal section having two sidewalls carrying a roller shaft and a connecting backwall, said bracket being mounted at its upper side adjacent to the backwall, articulated around a transverse axis spaced from the roller shaft, between the upright flanges of the channel section, the backwall of which is at its lower side in engagement with the longitudinally movable connecting means comprising a sheet strip.

* * * * *